United States Patent [19]

Buys et al.

[11] Patent Number: 4,765,898
[45] Date of Patent: Aug. 23, 1988

[54] SEMIPERMEABLE MEMBRANES BASED ON POLYMERS CONTAINING SULPHONATE GROUP

[75] Inventors: Henricus C. W. M. Buys, Vianen; Aart J. Naaktgeboren; Johan Gons, both of Dedemsvaart, all of Netherlands

[73] Assignee: Stork Friesland B.V., Gorredijk, Netherlands

[21] Appl. No.: 878,347

[22] Filed: Jun. 25, 1986

[30] Foreign Application Priority Data

Jun. 26, 1985 [NL] Netherlands ............... 8501838

[51] Int. Cl.$^4$ ............................................. B01D 13/00
[52] U.S. Cl. .................................................. 210/500.41
[58] Field of Search ................... 210/500.41, 640; 521/27; 528/175

[56] References Cited

U.S. PATENT DOCUMENTS 3,658,757 4/1972 Conix et al. ............... 528/175 X
4,026,977 5/1977 Bourgaiyel ............... 210/500.41 X
4,067,805 1/1978 Chiang et al. ............... 210/640 X Primary Examiner—Frank Spear
Attorney, Agent, or Firm—James E. Nilles

[57] ABSTRACT

Semipermeable membrane consisting of a polymer, embodying [—SO$_3$—] groups; said [—SO$_3$—] groups may be present in the continuous polymer chains or may be present in links between continuous polymer chains. The membrane may have been formed either by in situ coagulation of a polymer solution in the pores of a porous substrate or by interfacial crosslinking of a water-soluble phenolic polymer with a sulphonyl halide compound to form an [—SO$_3$—] groups embodying polymer in the pores of a substrate.

17 Claims, No Drawings

SEMIPERMEABLE MEMBRANES BASED ON POLYMERS CONTAINING SULPHONATE GROUP

BACKGROUND OF THE INVENTION

The invention relates to a semipermeable membrane consisting of a polymer containing aryl groups which embodies [—SO$_3$—] groups.

Semipermeable membranes of this type are known. Thus, ICJL-RD 210-009 (Imperial Chemical Industries Limited Research Disclosure) describes semipermeable membranes which are formed by sulphonated polyaryl ether sulphone polymers in which (—SO$_2$—) groups occur in the chains as well as [—SO$_3$—] groups coupled to the chains. Membranes of this type are suitable, inter alia, for hyperfiltration, reasonably good retentions and fluxes being obtained for salt; salt retentions greater than 90% and fluxes greater than 40 liter/m$^2$.h.bar at 40 bar are generally not achieved.

An important disadvantage of such sulphonated polyaryl ether sulphone polymers is their relatively low thermal stability. As a result, use of membranes of this type above 80° C. is not possible; above said temperature deformation and impairment of properties occurs.

SUMMARY OF THE INVENTION

It is now the object of the invention to provide a semipermeable membrane which does not have said drawbacks.

Surprisingly, it has now been found that semipermeable membranes having retentions and fluxes higher than the abovementioned values and, in addition, a very good thermal resistance are obtained if the [—SO$_3$—] groups of the polymer are present in the polymer chain.

The difference in the polymers of semipermeable membranes according to the prior art and the polymers for the manufacture of membranes of this type according to the invention resides in the fact that in the polymers according to the invention [—SO$_3$—] groups are accommodated in polymer chains and therefore there are no terminal [—SO$_3$—] groups such as, for example, is the case in an [—SO$_3$H] group which is attached to a chain.

The good thermal resistance (up to approx. 100° C. and in particular embodiments up to 110° to 120° C.) in particular makes the membrane usable in a wide membrane separation field, viz. microfiltration, ultrafiltration, hyperfiltration, pervaporation, vapor permeation and gas separation.

In particular, a very suitable polymer for the manufacture of semipermeable membranes according to the invention is formed by a polymer in which the [—SO$_3$—] groups of the polymer are accommodated in continuous polymer chains.

A polymer of this type containing [—SO$_3$— groups according to the invention is illustrated by general formula 1:

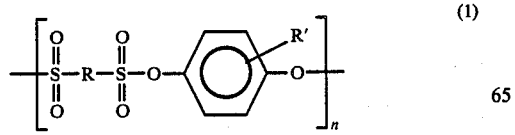

(1)

wherein

R denotes one or more coupled benzene nuclei, which may or may not be substituted, in which the benzene nuclei may be directly coupled by a bond between ring C atoms, or at least two rings may have 2 ring C atoms in common, or the coupling comes about through an alkyl group or through a

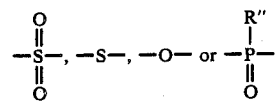

group in which R" represents alkyl or aryl and the ring substituents optionally present are chosen from meta-directing groups such as —NO$_2$, —C≡N or

situated in the ortho position with respect to the coupling of the benzene nuclei specified above, and R' denotes a benzene nucleus, which may or may not be substituted, and the coupling to the adjacent benzene nucleus, which may or may not be substituted, in formula (1)

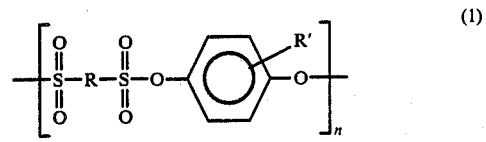

(1)

is brought about by:
a direct bond between ring C atoms,
an alkyl group or an

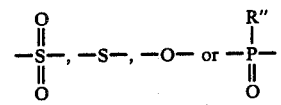

group in which
R" represents alkyl or aryl and the ring substituents optionally present are chosen from ortho-/para-directing groups such as —N(CH$_3$)$_2$, —NH$_2$, —OH, —OCH$_3$, —CH$_3$, F, Cl, Br or I etc, situated in the meta position with respect to the above specified coupling between R' and the adjacent benzene nucleus which may or may not be substituted.

In the formulae 7 to 12:

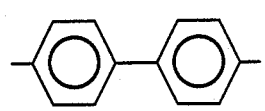

(7)

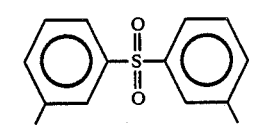

(8)

-continued

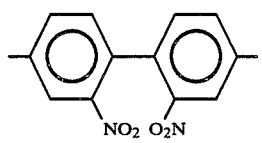
(9)

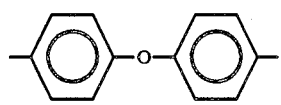
(10)

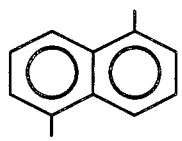
(11)

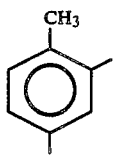
(12)

some often-used examples of the groups R present in formula 1:

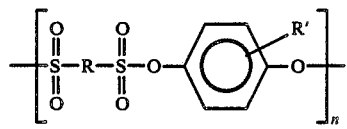
(1)

are given, while the meaning of R' is represented by formulae 13, 14 and 15:

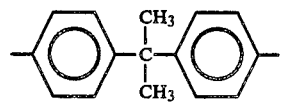
(13)

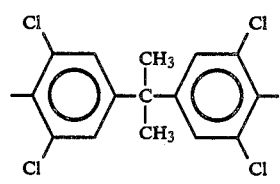
(14)

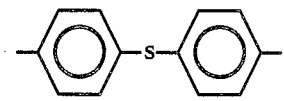
(15)

and also 7 and 8:

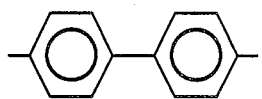
(7)

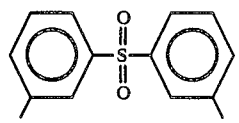
(8)

According to the invention several different units of R and/or R' may also occur in the same chain.

If R or R' contains an alkyl group, said alkyl group will in general contain 1 to 6 C atoms. The polymers specified above having general formula 1:

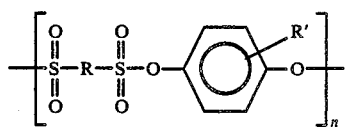
(1)

may be prepared in a manner common for this type of polymer.

DESCRIPTION OF THE PREFERRED EMBODIMENTS

A very common manner of preparation is by interface polymerization, in which, for example, a disulphonyl chloride compound reacts with the disodium salt of a diphenol compound, the diphenol compound being dissolved in water and the disulphonyl chloride being dissolved in a solvent, which is not miscible with water, in the presence of a so-called phase-transfer catalyst.

In the case of a manner of preparation of this type the disulphonyl chloride compound, the solvent and the phase-transfer catalyst are introduced into a glass beaker. The solution of the disodium salt of the diphenol compound in water is then added over a period of 2 to 30 min. while vigorously stirring with an emulsification stirrer head.

In that case the organic and aqueous phases are expediently well cooled beforehand in order to limit as far as possible the effects of the mechanical energy introduced and the heat of the reaction developed.

After the addition a tacky compound is obtained which is worked up by acidification with a dilute acid, for example hydrochloric acid.

A solvent such as n-hexane is added while stirring, whereupon the polycondensate separates in pieces and/or flakes.

After finely dividing with a high-speed dispersion device, the polycondensate is filtered off and washed with hexane, water, methanol and water.

TABLE 1

| Test | Comonomer $R(SO_2Cl)_2$ R from formula no. Mol $R(SO_2Cl)_2$/ no. of ml $CH_2Cl_2$ | Comonomer NaO—Ar—R'—O—Na R' from formula no. Mol NaO—Ar—R'—O—Na/ no. of ml $CH_2Cl_2$ | Catalyst TEBACl g | Yield % of theory | $[\eta]$ intr dl/g |
|---|---|---|---|---|---|
| Na 70 | 7 0.2/400 | 13 0.2/400 | 2.5 | 91 | 2.2 |
| Na 161 | 7 0.1/200 | 14 0.1/200 | 1.25 | 95 | 0.9 |
| TL 76 | 7 | 15 | 1.25 | 90 | 0.8 |

TABLE 1-continued

| Test | Comonomer R(SO₂Cl)₂ R from formula no. Mol R(SO₂Cl)₂/ no. of ml CH₂Cl₂ | Comonomer NaO—Ar—R'—O—Na R' from formula no. Mol NaO—Ar—R'—O—Na/ no. of ml CH₂Cl₂ | Catalyst TEBACl g | Yield % of theory | $[\eta]$ intr dl/g |
|---|---|---|---|---|---|
| NA 82 | 0.1/200 8 | 0.1/200 13 | 0.75 | 96 | 1.0 |
| NA 47 | 0.06/120 9 0.05/60 | 0.06/120 13 0.05/105 | TEBAI 0.70 | 88 | 0.14 |

In table 1 a survey is shown of a number of polycondensations carried out in which the solvent for the organic phase is dichloromethane and the diphenol compound is dissolved in water. The properties of the polymer formed are specified by quoting the intrinsic viscosity in 1,1,2,2-tetrachloroethane at 25° C. in dl/g.

In general triethylbenzylammonium chloride, indicated by TEBACl, is used as the phase-transfer catalyst, in some cases use is also made of tetrabutylammonium iodide (TABI) or triethylbenzylammonium iodide (TEBAI).

TABLE 2

| Test | Comonomer or mixture thereof R(SO₂Cl)₂ R from formula no. Ratio of R compounds Total mol of R compounds/ no. of ml of CH₂Cl₂ | Comonomer or mixture thereof NaO—Ar—R'—O—Na R' from formula no. Ratio of R compounds Total mol of R compounds/ no. of ml of CH₂Cl₂ | Catalyst TEBACl g | Yield % of theory | $[\eta]$ intr dl/g |
|---|---|---|---|---|---|
| Na 87 | 7:8 (0.5:0.5) 0.145/285 | 13 (1) 0.15/300 | 1.88 | 93 | 0.57 |
| Na 150 | 7 (1) 0.1/200 | 16:13 (0.1:0.9) 0.1/200 | 1.25 | 93 | 0.35 |
| TL 77-79 | 7 (1) 0.05/100 | 16:15 (0.1:0.9) 0.05/100 | 0.64 | 98 | 0.70 |

In table 2 a survey is given of a number of polycocondensations carried out in which a mixture of aromatic disulphonyl chloride and/or a mixture of aromatic diphenol compounds, it being possible additionally to supplement the diphenol compound with another difunctional compound, were/was used.

Another beneficial difunctional compound as a supplement to the diphenol compound is, for example, piperazine having formula 16:

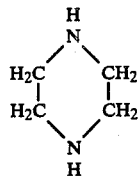

(16)

other possibilities are dimethylpiperazine or dipiperidylpropane.

The abovementioned tables 1 and 2 show a number of synthesized polymers containing sulphonate groups; said tables should not, however, be interpreted as restrictive.

In order to form a semipermeable membrane making use of one of the synthesized polymers shown above, the polymer is dissolved in a suitable solvent and then spread out on a base, whereafter the polymer solution is allowed to evaporate for a short time, after which the polymer is brought into contact with a coagulation medium in which the solvent of the polymer solution can be absorbed.

Solvents which can satisfactorily be used for the polymers according to the invention are, for example, N-methylpyrrolidone and dimethylformamide. Both solvents are extremely well miscible in water so that water can be satisfactorily used as a coagulation medium. As a result of the short evaporation time an increase in polymer concentration in the surface layer of the polymer is achieved, which layer will later determine the retention properties when the semipermeable membrane is used. The remaining section of the polymer layer will, after leaching out the solvent, exhibit a structure having relatively large pores, and said layer having large pores will function as a supporting layer for the layer with extremely fine pores.

Both the abovementioned solvents can be used separately; mixtures of the solvents referred to with other solvents such as acetone, dioxane and water may also be used.

It has been found that the best results are obtained if the polysulphonate polymer to be formed into a membrane has an intrinsic viscosity which is greater than 0.5 dl/g.

Preferably the so-called casting syrup in the form of a solution of the polymer contains a polymer with an intrinsic viscosity which is greater than 0.8 dl/g.

The abovementioned type of polymers are formed into asymmetric semipermeable membranes and outstanding results are obtained.

The results of the various membranes are, of course, strongly dependent on their manner of manufacture, the quality is strongly influenced by the conditions and duration of evaporation, the temperature and the composition of the coagulation medium, the drying conditions, and the post treatment conditions.

It has been found possible to manufacture membranes which exhibited salt retentions of better than 90% with fluxes of up to 40 liter/m².h bar at 40 bar.

As regards the application of asymmetric membranes of this type, the latter is not restricted to the separation of liquid mixtures and applications in the field of separation of vapour mixtures and separation of gas mixtures at elevated temperatures belong to the possibilities. This aspect will be explained in Example V in more detail.

Up to this point the discussion has been about asymmetric semipermeable membranes in which the polymer of the membrane contains [—SO₃—] groups which are situated in linear continuous polymer chains as chain groups.

The semipermeable membranes according to another aspect of the invention are characterized in that the [—SO₃—] groups of the polymer are accommodated in linking chains situated between linear chains.

In this type of polymer the manufacture of a type of semipermeable membrane other than that discussed hitherto must be considered. This relates to the manufacture of so-called composite membranes.

Composite membranes are generally formed on a porous base, the porous base being coated with, for example, a water-soluble polymer; the excess of water-soluble polymer is then removed from the surface of the base, whereafter the base, together with the watersoluble polymer situated in the pores, is immersed in a solvent miscible with water which contains a crosslinking agent for the water-soluble polymer.

As the porous base, a microporous membrane, which possesses little retention capacity as such, may be used. An ultrafiltration membrane, which may exhibit very good retention as such, may also be used.

The crosslinking agent will expediently be taken up in a solvent in which the water-soluble polymer is not soluble. At the interface between the organic solvent containing crosslinking agent and the layer of water-soluble polymer a crosslinking reaction will then take place which will in general give rise to the formation of a three-dimensional crosslinked network.

The polymer containing [—SO₃—] groups in which said [—SO₃—] groups are incorporated as linking chains between polymer chains is illustrated by the general formula 2:

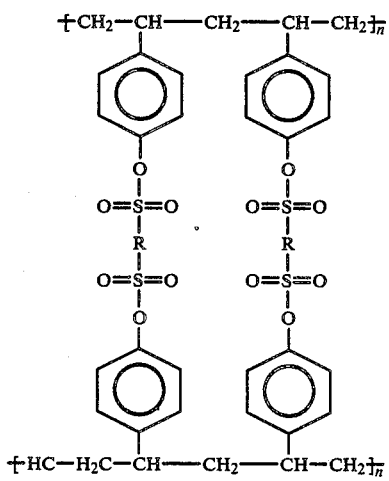

(2)

wherein

R denotes one of more coupled benzene nuclei, which may or may not be substituted, in which the benzene nuclei may be directly coupled by a bond between the ring C atoms, or at least two rings may have 2 ring C atoms in common, or the coupling comes about through an alkyl group or through a

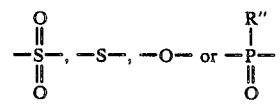

group in which R″ represents alkyl or aryl and the ring substituents optionally present are chosen from meta-directing groups such as —NO₂, —C≡N or

situated in the ortho position with respect to the above specified coupling between the benzene nuclei.

Here again it is also the case that the polymer may contain linking chains in which several different R units occur.

In general a membrane of this type is formed by reaction of at least one water-soluble polymeric phenol compound with a crosslinking agent in the form of at least one difunctional aromatic sulphonyl halide compound.

A water-soluble polymeric phenol compound of this type is expediently a salt of polyvinylphenol with the general formula 3:

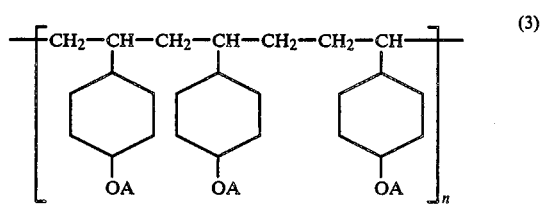

(3)

wherein A expediently represents an alkali-metal ion or a tetraalkylammonium ion.

A polyvinylphenol of this type has advantageously an averaged molecular weight between 1000 and 200,000.

With special advantage, in addition to the polyvinylphenol used, a difunctional or oligofunctional phenol may also be added to the aqueous phase, the phenol having the general formula 17 or 18:

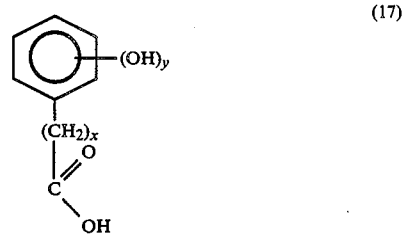

(17)

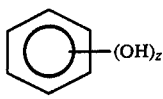 (18)

wherein X=1-6, Y=1-5 and Z=1-6, or a phenol as in formulae 19-24:

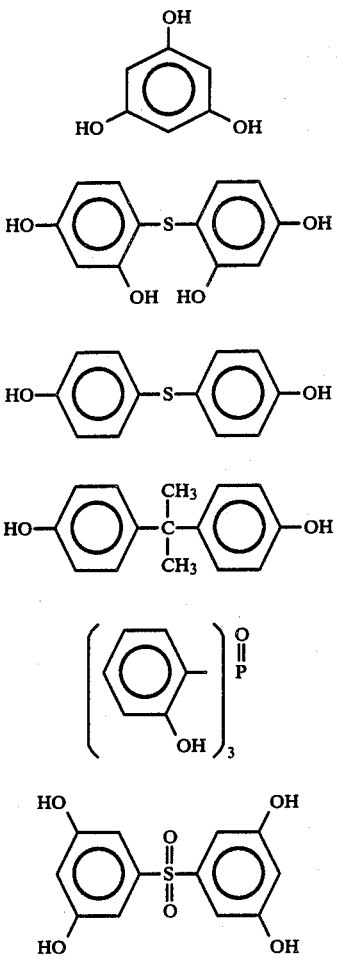

An addition of this type has, on the one hand, a flux-increasing effect and, on the other hand, a retention-increasing effect.

The difunctional aromatic sulphonyl halide compound has the general formula 4:

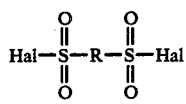 (4)

wherein R has the same meaning as already specified previously above for groups of this type, while Hal represents a halogen atom such as, for example, chlorine.

Particularly good results were obtained if the difunctional sulphonylchloride compound phenoxybenzene-4,4′-bis(sulphonylchloride) having formula 5:

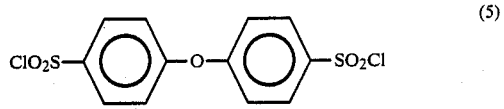 (5)

was used.

By then impregnating a microporous or ultrafiltration base with a polyvinylphenol solution in water and removing the excess of polyvinylphenol solution from the surface of the base and subsequently immersing the base in a solution of, for example, phen-oxybenzene-4,4′-bis(-sulphonylchloride) in a solvent such as diisopropyl ether a crosslinking of the two compounds is brought about at the interface between the aqueous solution and the organic solution with the formation of a crosslinked polymer layer which can serve as a semipermeable membrane.

In certain cases it is of advantage to use a crosslinking agent in the form of a multifunctional aromatic acid halide compound in addition to the difunctional sulphonylchloride compound as crosslinking agent. A compound of this type is, for example, formed by trimesoyl chloride having formula 6:

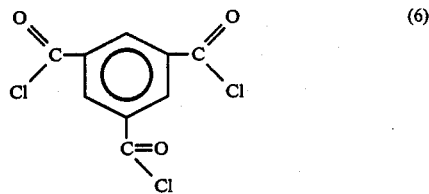 (6)

In general an addition of trimesoyl chloride of 10 to 20% referred to the quantity of sulphonylchloride is eminently sufficient.

The composite membrane is advantageously washed after formation with dilute acid such as sulphuric acid or hydrochloric acid to neutralize the phenolate ions. Phenolate ions of this type produce a strongly basic medium, which on oven-treating composite membranes of this type may give rise to severe hydrolysis, which is, of course, undesirable.

Depending on the manner of manufacture, excellent results were also obtained in the case of these composite membranes, salt retentions greater than 90% being obtained with fluxes of better than 40 liter/m²h bar at 40 bar. The invention will now be explained by reference to a number of examples.

EXAMPLE I

Preparation of a polymer NA70, containing chain sulphonate groups, from Table 1.

70.25 g (=0.20 mol) of 4,4′-diphenyldisulphonyl chloride and 2.5 g of triethylbenzylammonium chloride in 400 ml of $CH_2Cl_2$ (methylene chloride) are stirred for 5 minutes in a 2-liter plastic beaker with an Ultraturrax ® emulsification head. 45.7 g (=0.20 mol) of 2,2′-bis(4-hydroxyphenyl)-propane are dissolved in 400 ml of $H_2O$ +16.3 g of NaOH (=0.407 mol) under $N_2$ by heating to 70° C. followed by cooling to 8° C.; 0.3 g of $Na_2S_2O_4$ is added to this solution.

The cooled aqueous phase is added to the cooled organic phase (10° C.) in 2 minutes while stirring with the Ultraturrax ® emulsification head. For the first 8 minutes the emulsion proves to be readily stirrable. A rise in temperature from 8° C. to 30° C. occurs. Hereafter the paste becomes tacky and is stirred further with an Ultraturrax® fibrillation head for ½ an hour.

For working up, 150 ml of 1% HCl is added and stirred for 5 minutes. 1.5 liters of n-hexane is then added while stirring. After adding 0.5 liters of water while stirring, the separated polymer is filtered and subsequently rinsed a few times with n-hexane, water, methanol, water, methanol and n-hexane. After drying in air and under vacuum, the polymer is dissolved in dimethylformamide/N-methylpyrrolidone (60/40 v/v) to a level of approximately 13% by weight and precipitated in 4 liters of methyl alcohol/water mixture (3/1 v/v). After washing with methanol and n-hexane and drying in vacuum at 75°–100° C., 91% by weight are obtained compared with the theoretical yield.

The intrinsic viscosity measured at 25° C. in 1,1,2,2-tetrachloroethane is 2.2 dl/g.

EXAMPLE II

Preparation of a polymer TL 76, containing chain sulphonate groups, from Table 1.

35.12 g (=0.1 mol) of 4,4'-diphenyldisulphonyl chloride and 150 ml of $CH_2Cl_2$ are made into a suspension and cooled with ice. This organic phase is added within 1½ mins. in 5 batches to the aqueous phase, which is cooled in ice, while vigorously stirring with an Ultraturrax® emulsion head.

The aqueous phase has been prepared beforehand under nitrogen by adding 8.4 g (=0.21 mol) of NaOH grains to 21.8 g (=0.1 mol) of 4,4'-thiodiphenol in 200 ml of water; after heating briefly a solution is obtained. After cooling to 8° C., 0.2 g of $Na_2S_2O_4$ dissolved in 10 ml of $H_2O$ is added. The aqueous phase is then introduced into a 2-liter plastic beaker and 12.5 g of triethylbenzylammonium chloride in 6 ml of 0.5N NaOH are added. Immediately after this the addition of the organic phase is started. 15 ml of $CH_2Cl_2$ are used to rinse out the organic phase. The temperature in the suspension is 10°–15° C.

After 5 min. the reaction mixture is too tacky to stir. The emulsion head is replaced by a fibrillation head and stirring is carried out for 15 min. at 150 V (1000–2000 rpm). The pH of the mixture must remain >8!

60 ml of 1% HCl are now added (until the pH is 2 to 3) and the suspension is stirred for a further 20 min. 400 ml of n-hexane is introduced three times while stirring, the polymer separating as a tacky ball. The polymer is ground up by means of the fibrillation head. After 15 mins. the mixed solution (water/n-hexane) is neutralized with 0.3N ammonium acetate (pH=6–7). After stirring for a short time, filter off polymer on a glass filter and rinse with 1 liter of $H_2O/3 \times 500$ ml of n-hexane/500 ml of $CH_3OH$/500 ml of $H_2O$/500 ml of $CH_3OH$/500 ml of n-hexane.

After drying in the air and in vacuum at 50°–100° C. 47.8 g of polymer are obtained.

For the purpose of reprecipitation the polymer is dissolved in 250 ml of N-methylpyrrolidone (NMP) and after filtering on a glass fibre filter (rinse with 2 ml of NMP) it is precipitated while stirring with an Ultraturrax® in 3 liters of $CH_3OH/H_2O$ (3/1 v/v). After filtering off and rinsing with $H_2O$, $CH_3OH$ and n-hexane and drying in air and in vacuum, 44.8 g (90% by weight) are obtained.

EXAMPLE III Ultrafiltration (UF) membranes

As a rule ultrafiltration membranes have flux values which vary in the range from 5 to 200 $l/m^2.h.100$ kPa. Ultrafiltration membranes based on the polymer according to formula 1

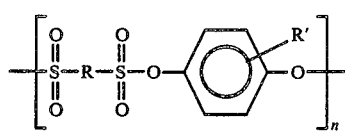

with R according to formula 7:

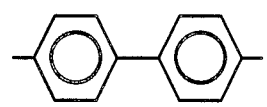

and R' according to formula 13:

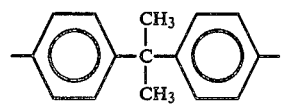

were prepared following Example I. A clean water flux at 25° C., expressed in $l/m^2.h.100$ kPa (100 kPa=1 bar), of 5–200 is achievable depending on the composition of the casting syrup. Three examples are given below:

| Casting syrup composition in % by weight | Flux* $l/m^2 \cdot h \cdot 100$ kPa | Retention** greater than 90% for: |
|---|---|---|
| polymer/dimethylformamide (18/82) | 150–200 | PEG 100,000 |
| polymer/dimethylformamide methylcellosolve) (17/66/17) | 80–120 | PEG 10,000 |
| polymer/N—methyl-pyrrolidone/acetone/water (20/64/12.8/3.2) | 10–20 | PEG 4,000 |

*measured at 300–500 kPa
**the measurements have been carried out on 0.1% by weight solutions of polyethylene glycol (PEG) having the specified molecular weight in water.

The above ultrafiltration membranes can be used at temperatures of up to 100°–110° C.

EXAMPLE IV: Composite hyperfiltration (HF) membranes

In the tests which follow hereafter use was made of polyvinylphenol with an average molecular weight of 30,000. Composition:

(A)

Polyvinylphenol: 3% by weight in water
Phenoxybenzene-4,4'-bis(sulphonylchloride); 1% by weight in solvent
Trimesoyl chloride: 0.1% by weight in solvent
Solvent: diisopropylether
Base: polysulphone
Depending on the method of manufacture the following is found:
Fluxes in $l/m^2.h.bar$ at 40 bar: 30–79
Retention in % for common salt: 70–95

(B)

Addition of diphenols or oligophenols to the water phase in general leads to improved retention and flux.

Phenols used:

phloroglucinole (formula 19)

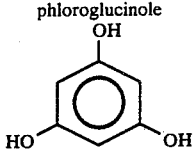

resorcinol sulphide (formula 20)

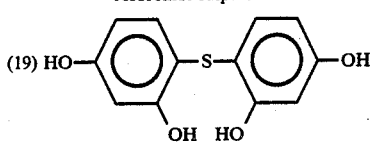

4-4'-thiodiphenol (formula 21)

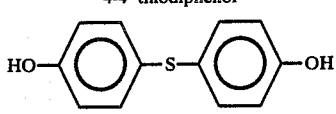

bisphenol A (formula 22)

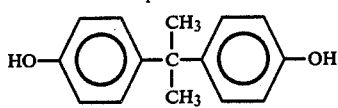

tris(2-hydroxyphenyl)phosphonium oxide (formula 23)

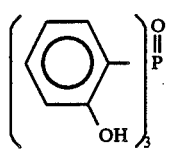

3,3',5,5'-tetrahydroxydiphenyl sulphone (formula 24)

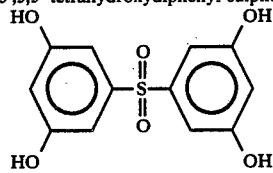

EXAMPLE V: Vapour Permeation

Polysulphonate membranes according to the invention are particularly suitable for carrying out vapour permeation, in particular to separate water from organic solvents.

Vapour permeation has preferably to be carried out at the boiling point of the respective mixture at atmospheric pressure or above.

This implies that a good thermal stability of the membrane in the vapour from the mixture is a requirement.

In ethanol-water vapour at approx. 85° C. this type of membrane is found to be satisfactorily stable.

Selective water transfer through the membrane is obtained by passing the vapour at atmospheric pressure along the membrane while maintaining a vacuum on the other side of the membrane (the permeate side).

As an example, a separation experiment is shown in Table 3 where dehydration is carried out starting from 6% water down to 0.3% water. This experiment was carried out with a homogeneous membrane 30 μm thick manufactured from the polymer from Example I. The fluxes found must, of course, be related to this thickness. If an asymmetric membrane is made from this material (according to the known techniques), the rise in the flux of said membrane will be inversely proportional to the thickness of the selective top layer.

As emerges from Table 3, the separation factor of the membrane for water/ethanol increases as the water content becomes lower. This is a very advantageous affect because as a result the ethanol concentration in the permeate, even at extremely high ethanol concentrations in the feed, remains very low.

The flux considerably decreases towards higher alcohol contents. This is a common effect in hydrophilic membranes. The disadvantage of the decreasing flux is, however, more than compensated for by the fact that the fraction of water to be removed also decreases considerably for a lower water content.

The example shown in Table 3 is not isolated; other alcohols such as propanol and the butanols can also be dehydrated by vapour permeation through polysulphonate membranes.

TABLE 3

| Feed % by weight EtOH | Membrane Temperature °C. | Flux Kg/m²h | Separation Factor α |
|---|---|---|---|
| 94% | 85 | 0.015 | |
| 95% | 84 | 0.015 | 460 |
| 98% | 86 | 0.011 | 770 |
| 98.7% | 82 | 0.008 | 940 |
| 99.0% | 82 | 0.008 | 1000 |
| 99.5% | 82 | 0.006 | 1220 |
| 99.7% | 84 | 0.006 | 1630 |

The separation factor α shown in TABLE 3 is defined as follows:

$$\alpha = \frac{x_{permeate}}{1 - x_{permeate}} \times \frac{1 - x_{retentate}}{x_{retentate}}$$

$x_{permeate}$ = molfraction x of the component to be purified in the permeate
$x_{retentate}$ = molfraction x of the component to be purified in the retentate

What is claimed is:

1. A thermally-resistant semipermeable speparation membrane, consisting essentially of a polymer containing —SO₃— groups in a chain thereof, each of said —SO₃— groups being connected directly and exclusively to an aryl group having at least 6 carbon atoms.

2. The semipermeable membrane according to claim 1, wherein said polymer containing —SO₃— groups has the formula:

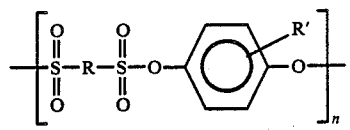

wherein R is one or more coupled benzene nuclei, which are unsubstituted or substituted, and wherein the benzene nuclei are:

(a) directly bonded by a bond between ring carbon atoms of said nuclei, or (b) at least two nuclei have two ring carbon atoms in common, or (c) said benzene nuclei are bonded by having therebetween a lower alkyl group or a group of the formula:

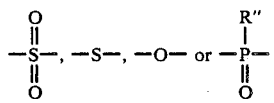

wherein R" is a lower alkyl group or aryl group, which aryl group is unsubstituted or substituted by one or more meta-directing groups selecting from the group consisting of nitro, cyano and aldehyde groups, which groups are present in an ortho-position with respect to the coupled benzene nuclei; and R' is a benzene nucleus which is unsubstituted or substituted, and which is coupled to the adjacent benzene nucleus by means of:

(e) a direct bond between ring carbon atoms of said nuclei, or (f) at least two benzene nuclei have two ring carbon atoms in common, or (g) said benzene nuclei are bonded by having therebetween a lower alkyl group or a group of the formula:

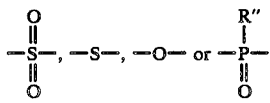

wherein R" is a lower alkyl group or aryl group, which aryl group is unsubstituted or substituted by one or more ortho-para-directing groups selected from the group consisting of dimethylamino, amino, hydroxy, methoxy, fluoro, chloro, bromo and iodo, said groups being present in an meta-position with respect to said coupled benzene nuclei described above between R' and said adjacent benzene nucleus.

3. The semipermeable membrane of claim 2, wherein one or more of the same or different R and R' units occur in the same chain.

4. The semipermeable membrane of claim 2, in which the alkyl groups of R and R' each have 1 to 6 carbon atoms.

5. The semipermeable membrane according to claim 2, in which the difunctional sulphonyl chloride compound is the compound phenoxybenzene-4,4'-bis(sulphonylchloride) having the formula:

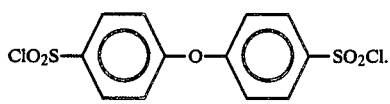

6. The semipermeable membrane according to claim 5, in which a mixture of compounds having the following formula is used:

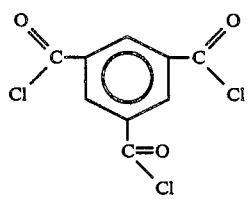

-continued

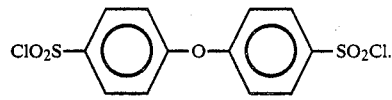

7. The semipermeable membrane according to claim 2, in which a crosslinking agent in the form of a multifunctional aromatic acid halide compound is also used.

8. The semipermeable membrane of claim 1, wherein said polymer is prepared by sulfonating the same after chain formation.

9. The semipermeable membrane of claim 1, wherein the —SO$_3$— groups of the polymer are accommodated in linking chains situated between linear chains.

10. The semipermeable membrane according to claim 9, in which the membrane is formed on a microporous base by reaction in situ between the polymeric phenol compound applied to the base and a crosslinking agent in the form of at least one difunctional sulphonyl halide compound.

11. The semipermeable membrane of claim 1, wherein said polymer having —SO$_3$— groups has the formula:

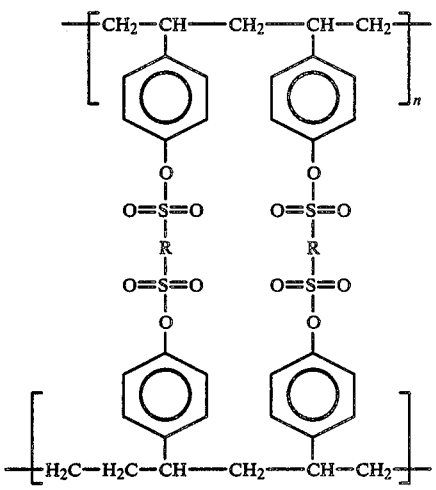

wherein R is one or more coupled benzene nuclei, which are unsubstituted or substituted, and wherein the benzene nuclei are:

(a) directly bonded by a bond between ring carbon atoms of said nuclei, or (b) at least two nuclei have two ring carbons in common, or (c) said benzene nuclei are bonded by having therebetween a lower alkyl group or a group having the formula:

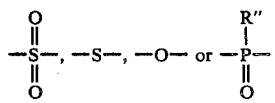

wherein R" is a lower alkyl or aryl group, which aryl group is unsubstituted or substituted by a meta-directing group selected from the group consisting of nitro, cyano and aldehyde, said group being present in an ortho-position with respect to said coupled bezene nuclei.

12. The semipermeable membrane of claim 11, wherein the polymer contains linking chains having different R groups therein.

13. The semipermeable membrane of claim 1, wherein the membrane is formed by reacting at least one water-soluble polymeric phenol compound with a crosslinking agent of at least one difunctional aromatic sulfonyl halide compound.

14. The semipermeable membrane according to claim 13, in which the water-soluble polymeric phenol compound is a salt of polyvinylphenol with the formula:

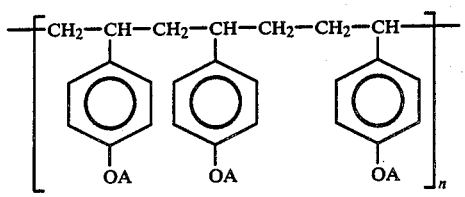

wherein A represents an alkali-metal ion or a tetraalkylammonium ion.

15. The semipermeable membrane according to claim 14, in which said polyvinylphenol having an averaged molecular weight MW of 1000–200,000 is used.

16. The semipermeable membrane according to claim 14, in which in addition to the polyvinylphenol used a difunctional or oligofunctional phenol is added to the aqueous phase, said phenol having the formula:

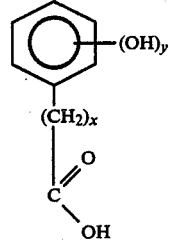

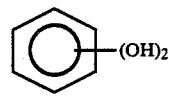

wherein X has the value 1–6, Y has the value 1–5 and Z has the value 1–6, or a phenol according to one of the following formulas:

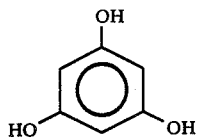

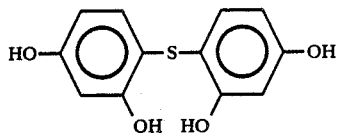

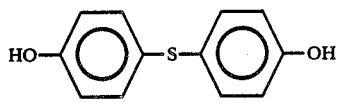

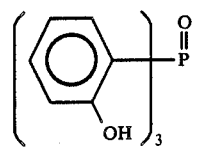

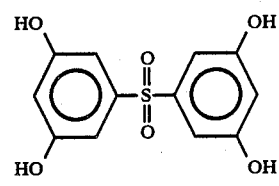

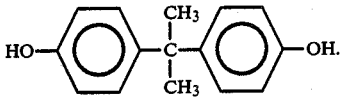

17. The semipermeable membrane according to claim 13, in which the difunctional aromatic sulphonyl halide compound has the formula:

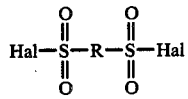

wherein R has the same meaning as in claim 2 and Hal represents a halogen atom.

* * * * *